(12) United States Patent
Lawrence

(10) Patent No.: US 6,192,374 B1
(45) Date of Patent: Feb. 20, 2001

(54) EFFICIENT IMPLEMENTATIONS OF CONSTRUCTS SUCH AS FEATURE TABLES

(75) Inventor: P. Nick Lawrence, Austin, TX (US)

(73) Assignee: Lawrence Technologies, LLC, Dallas, TX (US)

( * ) Notice: Under 35 U.S.C. 154(b), the term of this patent shall be extended for 0 days.

(21) Appl. No.: 09/169,266

(22) Filed: Oct. 10, 1998

(51) Int. Cl.⁷ .................................................. G06F 17/00
(52) U.S. Cl. ........................ 707/104; 707/101; 707/102; 707/5
(58) Field of Search .............................. 707/2, 3, 5, 104, 707/101, 102, 260; 711/206

(56) References Cited

U.S. PATENT DOCUMENTS

| | | | |
|---|---|---|---|
| 4,625,242 | 11/1986 | Baumberg | 358/209 |
| 4,680,700 * | 7/1987 | Hester et al. | 711/206 |
| 4,811,199 | 3/1989 | Kuechler et al. | 364/200 |
| 4,945,421 | 7/1990 | Baumberg | 358/217 |
| 4,972,363 | 11/1990 | Nguyen et al. | 364/807 |
| 5,093,900 | 3/1992 | Graf | 395/24 |
| 5,175,817 | 12/1992 | Adams et al. | 395/200 |
| 5,208,900 | 5/1993 | Gardner | 395/27 |
| 5,237,678 | 8/1993 | Kuechler et al. | 395/600 |
| 5,371,834 | 12/1994 | Tawel | 395/23 |
| 5,386,558 | 1/1995 | Maudlin et al. | 395/600 |
| 5,704,060 * | 12/1997 | Del Monte | 707/104 |
| 5,710,915 * | 1/1998 | McElhiney | 707/3 |
| 5,778,361 * | 7/1998 | Nanjo et al. | 707/5 |
| 5,799,184 * | 8/1998 | Fulton et al. | 707/2 |
| 5,924,068 * | 7/1999 | Richard et al. | 704/260 |
| 6,105,023 * | 8/2000 | Callan | 707/5 |

FOREIGN PATENT DOCUMENTS

| | | | | |
|---|---|---|---|---|
| 0079465 A2 | * | 5/1983 | (EP) . | |
| 0124097 A2 | * | 11/1984 | (EP) . | |
| 0 378 115 A2 | | 7/1990 | (EP) | G06F/15/80 |
| 2 206 428 | | 1/1989 | (GB) | G06F/15/31 |
| WO 93/14459 | | 7/1993 | (WO) | G06F/15/16 |

OTHER PUBLICATIONS

"XP–002111789" paper, from Internet at www.lt.com, *Lawrence Technologies*, 1996, two pages.
"XP–002111790" paper, from Internet at www.lt.com. *Lawrence Technologies*, 1996, three pages.
International Search Report for International Application No. PCT/US 99/06028, Mailed Aug. 24, 1999.

\* cited by examiner

Primary Examiner—Wayne Amsbury
Assistant Examiner—Thuy N. Pardo
(74) Attorney, Agent, or Firm—Baker Botts L.L.P.

(57) ABSTRACT

A methodology for producing efficient implementations of constructs such as feature tables is disclosed. The method of superimposed coding and the method of inverted list tables are combined. Although they both accomplish similar things, each method has advantages over the other under particular circumstances. The method of superimposed coding is used where feature table rows are "dense" or contain many records of interest, while the method of inverted list tables is used where feature table rows are "sparse" or contain few records of interest. The combination of the two methods results in a synergistic method that loses no accuracy and is generally faster in operation than what could be achieved by the application of either method alone.

2 Claims, 3 Drawing Sheets

EFFICIENT IMPLEMENTATIONS OF CONSTRUCTS SUCH AS FEATURE TABLES

FIELD OF THE INVENTION

The present invention relates generally to computer-based information retrieval and classification and, in particular, to a methodology for significantly reducing the computer processing time applicable to a broad range of information retrieval and classification methods.

BACKGROUND OF THE INVENTION

A wide range of computing tasks today require the comparison of some sort of "search criteria" to each Record in a database. Where the search criteria is certain to be found exactly in one or more of the Records, or not at all, excellent techniques are well known to organize and index the database, to provide rapid access to the Records of interest. This situation is called the problem of exact matching. Where the search criteria is unlikely to be found exactly in one or more of the Records, particularly where some kind of similarity or relevance metric is computed between the search criteria and each Record, then the techniques that work for the former, exact-match situation do not usually apply. This latter situation is called the problem of inexact matching.

One solution to the problem of inexact matching is to explicitly compare the search criteria with each Record in the database, applying whatever similarity or relevance metric may be appropriate to the situation. This solution, however, is slow, particularly when the number of Records in the database is large.

Better solutions are needed for the problem of inexact matching when the number of Records in the database is large, and some better methods are known. Two prominent better methods are the method of superimposed coding and the method of inverted list tables. Both of these methods depend for their operation on "Features" of both the Records and the search criteria, information elements that can be used to accumulate evidence about the relevance of any Record to the search criteria.

For each possible Record Feature, the method of superimposed coding provides a bitmap for each Record in the database, where a "0" bit guarantees that the corresponding Record does not contain the corresponding Feature, while a "1" bit indicates that the corresponding Record may contain the corresponding Feature.

Similarly, for each possible Feature, the method of inverted list tables provides a Record number or other identifier for each Record in the database that may contain the corresponding Feature, and no other Record numbers.

It is easy to see that these two methods, superimposed coding and inverted list tables, both provide essentially the same information in different forms. Given the information in the form of either method, it is straightforward to construct the form of the other method.

To use either of these methods to assist the problem of inexact matching, one starts with a feature table, then builds a coding table in the selected form. This coding table is simply a collection of the information available under the form about each Record and for each Feature, reflecting what is available in the feature table. A feature table is typically organized with rows of the table representing Features, and the information within each row representing Record status with respect to that row's Feature.

The feature table can then be used to eliminate quickly those Records that do not contain all of the Features of interest, as follows.

In the case of the method of superimposed coding, each row corresponds to a Feature and lists a "0" for Records that do not contain that Feature, and a "1" otherwise. The search criteria is examined for any of these Features that it may contain. The Features it does contain are then used to select row bitmaps. These row bitmaps are then logically combined using the bitwise logical AND function, with the result that the bitmap produced will contain a "0" in every bit position, corresponding to every Record, that does not contain exactly all of the required Features. The Records corresponding to "1" values in the result may contain all of the required Features. Each Record corresponding to a "1" value is then exhaustively compared to the search criteria by whatever means is in use, with the logical certainty that none of the Records corresponding to "0" values in the result bitmap are worthy of further consideration.

Similarly, the method of inverted list tables can be employed for the same purpose. In the case of the method of inverted list tables, each row corresponds to a Feature and lists the Record numbers of the Records of the database that may contain the Feature. As before, the search criteria is examined for any of these Features that it may contain. The Features it does contain are then used to select row lists. These row lists are then logically combined using the bitwise logical AND function. To combine these selected row lists, one must find those Record numbers that appear in each and every selected row list. The resulting list shows only those Record numbers that may contain all of the Features in the search criteria. Each such Record is then exhaustively compared to the search criteria by whatever means is in use, with the logical certainty that no other Records are worthy of further consideration.

In many cases, the number of "1" values remaining in the result bitmap after application of the method of superimposed coding, or the number of Records in the result list after application of the method of inverted list tables, is substantially smaller than the total number of Records. Thus, even though every one of these candidate result Records must be evaluated further against the search criteria, the task is much smaller than it would have been if every Record in the database had to be evaluated. This ability to eliminate quickly all but a few candidate Records of the database, which alone then undergo costly close inspection, can be a great benefit with respect to the overall speed of the search process.

Both the method of superimposed coding and the method of inverted list tables can encounter situations in which the other method is superior in terms of speed of operation. In the method of superimposed coding, when two row bitmaps are logically combined, all bits of both bitmaps must be considered, and the number of computational operations that must be performed is proportional to the total number of Records. In the method of inverted list tables, when two row lists are logically combined, only those Records in each of the two row lists must be considered, and the number of computational operations that must be performed is proportional to the product of the numbers of Records in each of the lists. In the "sparse" case, where the two row lists are very short and the corresponding two row bitmaps each contain very few "1" bits, then the number of computational operations implied by the method of inverted list tables can be substantially less than the number of operations implied by the method of superimposed coding. Conversely, in the "dense" case, where the two row lists are very long and the corresponding two row bitmaps each contain very many "1" bits, then the number of computational operations implied by the method of inverted list tables can be substantially more than the number of operations implied by the method of superimposed coding.

Thus both the method of superimposed coding and the method of inverted list tables have substantial weaknesses with respect to the other method under certain circumstances.

OBJECTS OF THE INVENTION

Accordingly, it is an object of the present invention to provide a new and synergistic combination of the methods of superimposed coding and inverted list tables.

It is another object of the present invention to provide a combination of the methods of superimposed coding and inverted list tables that is generally faster in execution than either method by itself, while producing the same results.

It is another object of the present invention to provide an improved means to eliminate more quickly those Records in a database that are not relevant to the task at hand.

SUMMARY OF THE INVENTION

The shortcomings as well as other deficiencies and limitations of both the method of superimposed coding and the method of inverted list tables are obviated, in accordance with the present invention, by the combination of the two methods. This is effected by employing both methods and utilizing each where it is more advantageous than the other. In the construction of the feature table for a specific application, the row bitmap for each row in the table is always supplied, whereas the inverted list for the same row is supplied only if the number of Records in the inverted list is "small," as will be discussed in detail below. To find the final candidate Records list, use the one of the two methods that has the lower computational cost, determined on a row by row basis. This results in an overall faster operation than would be achieved by either of the methods in isolation, while losing no accuracy whatsoever.

The technique of this current invention is broadly applicable to any database situation where it is advantageous to profile database Records in terms of computable Features. The current invention is also applicable in any situation where either a superimposed coding or an inverted list table by itself could be used advantageously. Since application of the current invention results in a computational cost that is always that of the lower-cost of the two component methods, the combination taught by the current invention is synergistic in that it produces results that are never inferior to, and almost always superior to, either method as applied alone.

Practical consequences of this invention are the creation of faster, smaller systems that will function as well or better in all situations currently dealt with by either superimposed coding or inverted list tables, and in other many situations as well.

DETAILED DESCRIPTION

Figure 1:
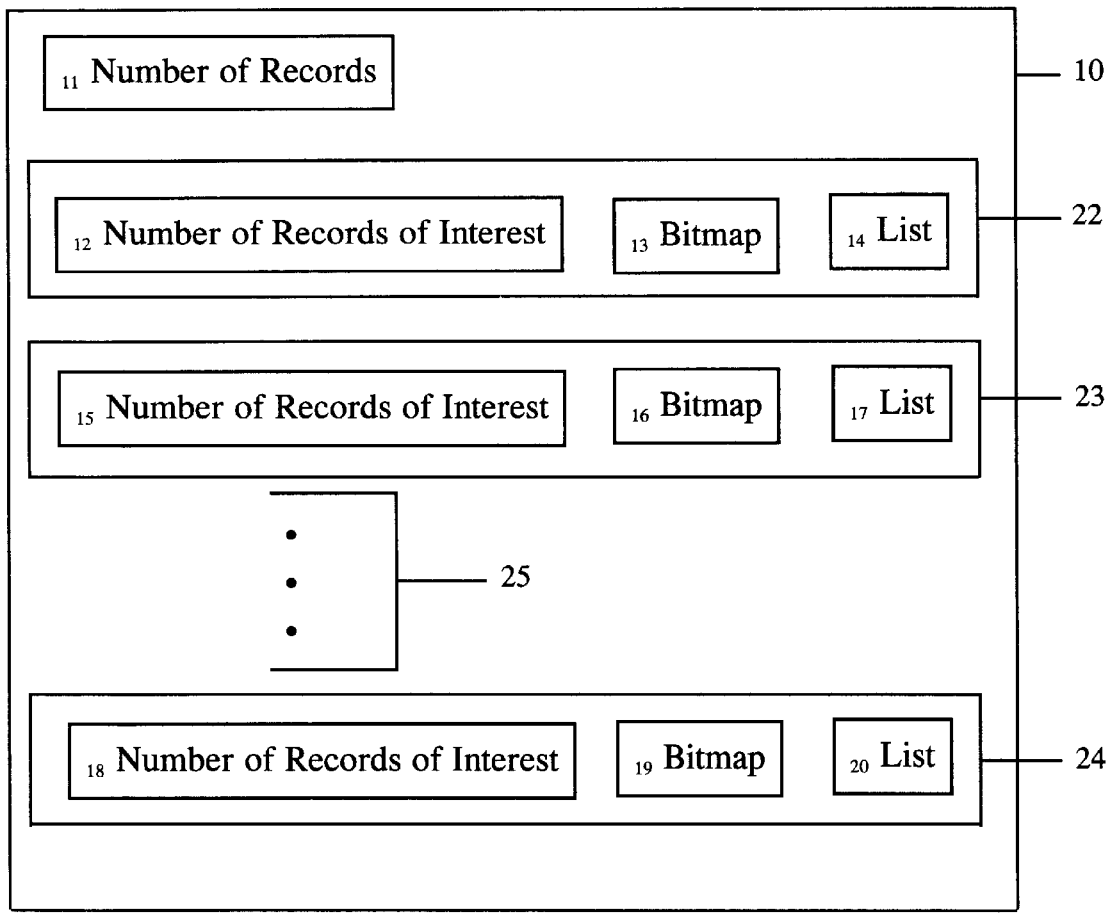
FIG. 1 is a schematic representing the coding table of the invention.

The following detailed description will permit a more complete understanding of this invention. However, the embodiment described below is simply an example of the invention, and the invention is not limited to this embodiment. It will be understood that the architecture of the present invention may be implemented with the use of various configurations of processors with appropriate modification. Accordingly, the specific configurations hereinafter described provide a non limiting example of one implementation of the present invention. It will be further understood, that in certain instances, details may have been omitted which are not necessary for an understanding of the present invention, or which are well known and understood by those skilled in the art.

To understand the present invention, it is necessary to be familiar with both superimposed coding and inverted list tables, and how they are related. This is best done by presenting examples of each.

EXAMPLE FEATURE TABLE

Table 1 depicts a "feature table," a "Feature-by-Record" matrix for a hypothetical database. Each cell entry, (i,j), is a one-bit representation of the presence ("1") or absence ("0") of Feature i in Record j. The analysis necessary to identify the specific Features of interest, and to generate this table with respect to a specific database of Records, is done by one of the many traditional methods available for such analysis, and is outside the scope of this discussion. It is assumed that a feature table, such as this table, is provided to the methodology of this current invention as a starting point.

TABLE 1

| Features | Records | | | | |
| --- | --- | --- | --- | --- | --- |
|  | a | b | c | d | e |
| 1 | 1 | 1 | 0 | 0 | 0 |
| 2 | 0 | 1 | 0 | 1 | 1 |
| 3 | 1 | 0 | 1 | 1 | 0 |

In this tiny example, there are five Records, a through e, and three Features, 1 through 3.

There are many types of feature tables utilizing these and other bit definitions and logical and other operations. The current invention can be applied effectively to all of these, as will be apparent to those skilled in the art, because the method of superimposed coding and the method of inverted list tables are entirely equivalent, but have different processing speeds in different regions of a given problem. For example, some types of feature tables require that a "1" bit in the (i,j) element means that Feature i is DEFINITELY present in Record j, while other types require only that Feature i MAY be present in Record j. Other feature tables reverse this logic, such that a "1" guarantees that the Feature is present, while a "0" means that the Feature may or may not be present. Still other definitions are possible and well known to those skilled in the art. Which of those many types to use in a given situation is beyond our present scope. The current invention deals only with efficient implementations of constructs such as feature tables, not with their construction or ultimate use. Here, for purposes of illustration, we will deal with only one type, as described below, although it will be understood that the discussion applies equally well to all constructs such as feature tables.

Superimposed Coding

According to this example of the method of superimposed coding, each Feature is represented by a row of bits, a "bitmap," that represents the possible presence or definited absence of the given Feature in the corresponding Record.

For example in Table 1, Records c, d, and e are guaranteed NOT to have Feature 1 present in them, while Records a and b may or may not have Feature 1 present in them. A zero in the (i,j) element means that Feature i is definitely NOT present in Record j. Thus the feature table shown in Table 1 can be read directly as a set of rows, each having a bitmap suitable for superimposed coding. The superimposed coding of Table 1 is shown in Table 2.

TABLE 2

| Features | Bitmaps |
| --- | --- |
| 1 | 11000 |
| 2 | 01011 |
| 3 | 10110 |

To use superimposed coding, one specifies one or more Features and (typically) performs a logical AND on them, element by element. The result is a bitmap whose length in bits is equal to the number of Records. For example, specifying only Feature 1 would produce a "result bitmap" of:

| Record | a | b | c | d | e |
| --- | --- | --- | --- | --- | --- |
| result bitmap | 1 | 1 | 0 | 0 | 0 | which is interpreted to mean that Records "c", "d", and "e" do NOT have Feature 1. In other words, the only Records that need to be considered by other evaluation software are Records "a" and "b". These Records of interest can be read directly from the result bitmap. They are the Records corresponding to "1" bits in the result bitmap.

Specifying Features 1 and 3 would produce this "result bitmap":

| Record | a | b | c | d | e |
| --- | --- | --- | --- | --- | --- |
| Feature 1 | 1 | 1 | 0 | 0 | 0 |
| Feature 3 | 1 | 0 | 1 | 1 | 0 |
| result bitmap | 1 | 0 | 0 | 0 | 0 | since only Record "a" has a "1" for both Features 1 and 3. This result bitmap is interpreted to mean that Records "b", "c", "d", and "e" do NOT have both Features "1" and "3". The only Record that needs to be considered by other evaluation software is Record "a", which again can be read directly from the result bitmap.

Again, in this use of superimposed coding, a "0" in the result bitmap indicates that the Feature, or Feature combination, is definitely NOT present in the corresponding Record. A "1" means that the Feature may be present.

The important point in this example is that a "0" in the resulting bitmap guarantees that one or more of the Features specified is not present in the corresponding Record. This means that it is completely unnecessary to look at that Record in more detail. Ignoring such Records can result in a substantial savings in processing time, since it may be possible to eliminate looking further at a substantial portion of the Records. This is one important reason superimposed coding is widely known and used.

The number of operations that must be performed is proportional to the sum of the number of Records indexed times the number of Features being searched. The exact number of operations in a given case has to be determined by analysis of the particular superimposed coding algorithm being used and how it is applied. Some superimposed coding algorithms do bitwise logical operations on whole words rather than bits, which can be more efficient on many computers. Other efficiencies are possible, such as checking the result bitmap for zeroes which, if found during the course of an application of the method, means that it is unnecessary to perform further logical AND operations against those bits containing zeroes.

Inverted Lists

An inverted list table presents the information in Table 1, but in a different form. Each Feature is itemized as in Table 1, but adjacent to each Feature is a list of the Record numbers of those Records that have a "1" bit in Table 1.

Table 3 shows an inverted list table for the same information that is shown in Table 1.

TABLE 3

| Features | Lists of Records | | |
| --- | --- | --- | --- |
| 1 | a | b | |
| 2 | b | d | e |
| 3 | a | c | d |

Repeating the previous examples, if Feature 1 is specified, we know immediately by accessing the list of Records associated with Feature 1 that the only Records that need to be considered are Records "a" and "b".

If Features 1 and 3 are specified, we have to work a little harder. For each Record listed in the inverted list table list for Feature 1, we need to check to see if that Record is also listed in the inverted list table list for Feature 3. This requires performing a number of comparisons equal to the product of the number of Records in the Feature 1 list times the number of Records in the Feature 3 list, or six comparisons in this case. Checking these six cases turns up the fact that only Record "a" occurs in both lists, and therefore only Record "a" needs to be considered further.

In general in the use of inverted list tables, an outer product must be formed of all the lists associated with the Features of interest in the inverted list table. The Records that are to be considered by other evaluation software are only those Records that appear on all of the lists associate with the Features of interest. Therefore, the number of comparisons that must be made under the inverted list table method in order to determine the final list of Records for further consideration, is the product of the lengths of the lists involved. However, note that this number may be reduced substantially by performing dyadic operations, in which case the computational complexity involves the sum of the products of pairwise comparisons of lists, where all but the first comparison involve intermediate result lists generated by earlier operations. The number of comparisons may also be reduced by other optimizations, all of which should be done to either or both methods prior to computing computational costs.

Putting the Methods Together

Although the end results are the same, the computational costs of using the two coding methods, superimposed coding and inverted list tables, are very different. Depending on the precise situation, the computational cost of either of these methods may be substantially lower than the computational cost of the other. Among the teachings of this current invention are guidance for those skilled in the art of estimating computational costs, regarding estimating the computational costs of the two coding methods in a given situation. This current invention also teaches how to put the two methods together into a single system, so as to employ the lower cost method consistently. Thus the use of the two methods in combination will be seen to be superior in almost every instance to the use of either method by itself, and except for the overhead of the additional computational work introduced by the current invention, which is usually negligible compared to the overall task, the combination is never inferior to the use of the better method alone.

The general principles behind this synergy can be understood as follows. If there are a large number of Records and if any given Feature appears in only a few Records, then the bitmap for the superimposed coding representation of that Feature will be almost entirely zeroes and only a few ones. Such a Feature row is called "sparse." An inverted list table entry for such a row will contain correspondingly few Record numbers. In this "sparse" case, it can be far more efficient to use the inverted list rather than the superimposed coding. This can be confirmed by counting required operations in such a case.

On the other hand, if any given Feature appears in a large number of the Records, then the bitmap for the superimposed coding representation of that Feature will contain a large number of ones and only a few zeroes. Such a Feature row is called "sdense." An inverted list table entry for such a row will contain a number of Records equal to the aforementioned large number of ones. In this "dense" case, it can be far more efficient to use superimposed coding rather than an inverted list. Again, this can be confirmed by counting the required operations in such a case.

Moreover, this decision between the two coding methods can be applied on a Feature-by-Feature basis. If the Feature row is "sparse" (has many zeroes), then that row should be processed using the method of inverted list tables; if the Feature row is "dense" (has many ones), then that row should be processed using the method of superimposed coding.

It is the recognition of the existence of this important tradeoff between the two methods that is one of the important aspects of this invention. By attention to this fact, and by taking into account the specific details of a given situation in light of this fact, the synergistic combination of the two methods can be achieved. It is only necessary to examine the exact situation in detail, taking into account such things as the number of computational operations, the speed of those operations in a given machine environment, and the specific uses to which the feature table will be put, to arrive at a beneficial application of the current invention in terms of the optimal combination of the two methods.

In the application of the current invention, each row may be represented as a bitmap of the method of superimposed coding, or as a list of the method of inverted list tables, or as both. The specific counts of computational operations involved in using each method will determine whether a given Feature row is "dense" or "sparse." For each row, if that row is "dense," then the bitmap should be used; if that row is "sparse," then the list should be used. For rows that are in doubt, both should be provided.

In the application of the current invention, when combining Feature rows, the length of each of the chosen rows is considered. The length of a row is the number of "1" bits in the row's bitmap in the case of the method of superimposed coding and alternatively, the number of Records in the row's list in the case of the method of inverted list tables. The length of a given row is the same under either method.

The chosen Features are sorted into a Sorted Features List according to the lengths of their respective rows. They are then divided into two groups, the "dense" group and the "sparse" group, according to the lengths of their rows. Either group may contain zero, one, or more members.

The "dense" group is then combined using the method of superimposed coding, by applying appropriate logical operations to the bitmaps in the manner well understood by those skilled in the art, to produce a result bitmap. The "sparse" group must be combined using the method of inverted list tables, by applying appropriate logical operations to the lists in the manner well understood by those skilled in the art, to produce a result list. The result bitmap from the "dense" combination must then be combined with the result list from the "sparse" combination by converting either of these forms to the other form, choosing as the target form whichever form results in the fewest operations, and combining the resulting converted form result with the other result to produce a final list of Records.

If one of the groups contains no members, then the final combination of the two groups just described is unnecessary. The final list of Records is simply the result from the group that does contain members.

If both groups contain no members, then the final list of Records contains no members.

In the case where both groups contain members, a final combination must be performed. This should be done in the form that produces the fewest computational operations.

The calculation of computational cost is important in the application of this current invention. The calculation of computational cost is a process that is well known and understood by those skilled in the art. Here it is assumed that these fundamental skills are understood clearly by the reader, and only those certain points that are unique to this current invention, or that may be less well understood, are discussed here.

Here are the means to decide how to form the sparse and dense groups, and to decide which form to convert to the other form in order to make the final comparison, if necessary. Analysis of the computational cost of each alternative for a given computer, implementation, and feature table objective will show the needed information. The principle is this: When two rows must be logically combined, every bit in both rows must be dealt with under the method of superimposed coding, but under the method of inverted list tables, it is the outer product of the two row lists that must dealt with. The computational cost, C(SC), of the former is approximately proportional to the total number of bits, both "1" bits and "0" bits, in each row bitmap involved; that is, the total number of Records, a number that does not depend on the number of "1" bits in either row bitmap. The computational cost, C(ILT), of the latter is approximately proportional to the product of the number of Records in each row list, a number that does depend on the number of Records in each row.

As a first approximation, if the product of the number of Records in each row list is less than the total number of Records, then it is computationally less expensive to combine the rows using the method of inverted list tables than it is to use the method of superimposed coding, and conversely.

This first approximation, of course, is very crude, and can be dramatically improved in accuracy, by considering further details of the situation. For example, it is customary in the implementation of the method of superimposed coding to pack the bits of each row's bitmap into the natural "word" of the machine on which the program will run. Most machines deal with bits in such groups of words, and require additional overhead to deal with bits individually. A common optimization is to perform logical bit operations using bitwise logical operators that operate on the entire word as a unit, rather than operating on each bit in turn. This reduces the total computational cost of combining two bitmaps by a factor approximately equal to the number of bits in a word. When determining C(ILT) and C(SC) for comparison in this case, the value of C(SC) will be found to be reduced over the previous value by a factor approximately equal to the number of bits in a word. This means that C(ILT) would have to be smaller by approximately that same factor to remain less than C(SC) in this case.

As another example of the types of details of the situation that must be considered in computing C(ILT) and C(SC), consider the fact that under the method of inverted list tables, each row lists Records. What are typically listed are really Record numbers, or other identifiers that uniquely identify specific Records, typically integers. The total number of Records referenced in the feature table determines what minimum machine representation is necessary to uniquely hold the Record numbers. This is required, because most computers have one or a few "natural" representations of integers, each consisting of a definite and fixed number of bits. Examples of such representations are the "byte," which is typically in units of 8 bits, the "short integer," which is typically in units of 16 bits, and the "integer," which is typically in units of 32 bits. The byte type can uniquely represent 256 different numbers; for the short integer type, the number is 65536; for the integer, it is 4294967296. Larger representations are possible. Thus if the row lists are composed of bytes, up to 256 Records could be uniquely referenced; if the row lists are composed of short integers, up to 65536 Records could be uniquely referenced; and if the row lists are composed of integers, up to 4294967296 Records could be uniquely referenced. The size of these representations enters into the calculation of a particular C(ILT), because the computational cost of comparisons between two such types, or other operations on them, is often a function of which type is being used. Thus C(ILT) has to be adjusted in well-known ways to take such factors into account.

In many cases, C(ILT) and C(SC) can be computed at the time a specific implementation of this current invention is made for a particular situation, and they will not change thereafter, unless some assumptions or conditions that influence them change. Things that could cause a need for changing them include increasing the number of Records handled by the system, which will affect C(SC), since it depends on the total number of Records. In making such an increase, C(ILT) can be affected by surpassing the maximum number of Records that can be represented by the chosen data type, necessitating a larger data type. Another common situation that will likely necessitate re-examining C(ILT) and C(SC) both is the porting of an existing system of this current invention from one computing environment to another. There are other examples, but if the implementation of this current invention is to be a static thing, then it is likely that both C(ILT) and C(SC) can be computed a priori.

To determine how to divide the Sorted Features List into two groups, one "sparse" and one "dense," apply C(ILT) and C(SC) in the following ways.

Beginning at the end of the Sorted Features List that is most likely to favor C(SC) as the smaller measure, which is the end of the Sorted Features List that has the "densest" rows, compute C(SC) for the first two rows and note the value of C(SC) in a table, T1. Next, compute C(SC) between the likely result of applying the method of superimposed coding to the previous two rows, and the next row, add that value of C(SC) to the previous table entry, and insert the resulting sum as the next entry in the table T1. Continue this accumulation of computational complexity until all rows in the Sorted Features List have been considered in order. If the Sorted Features List contains only one row, or if it contains none, then it is not necessary to form groups. Note that it is not necessary to know the likely result of applying the method of superimposed coding between two rows or between a row and a previous result row in order to compute C(SC), since C(SC) depends primarily on the number of Records, not the specific bit patterns.

Next, beginning at the end of the Sorted Features List that is most likely to favor C(ILT) as the smaller measure, which is the end of the Sorted Features List that has the "sparsest" rows, compute C(ILT) for the first two rows and note the value of C(ILT) in a table, T2. Then compute C(ILT) between the likely result of applying the method of inverted list tables to the previous two rows, and the next row, add that value of C(ILT) to the previous table entry, and insert the resulting sum as the next entry in the table T2. Continue this accumulation of computational complexity until all rows in the Sorted Features List have been considered in order. Again, if the Sorted Features List contains only one row, or if it contains none, then it is not necessary to form groups.

Note that the likely result of applying the method of inverted list tables between two rows or between a row and a previous result row depends on the specific Records in each and therefore may not be known a priori. In order to compute C(ILT) in this case, simply assume the worst case: that no Records are eliminated in the combining of rows under this method. This will provide an upper bound on C(ILT). If a better bound can be found, it should be used. Otherwise, this upper bound value of C(ILT) will suffice for the purposes of the current invention.

Now compare tables T1 and T2, taking into account that they were written in reverse order from each other. Reverse the order of either of the tables and place the two tables side by side. The intent here is for one of the tables to list increasing values and the other to list decreasing values.

To form the two groups, inspect the two tables side by side. If all of the values of T1 are uniformly smaller than the values of T2, then there is only one group, the superimposed coding group, and all combinations of rows should be done using that method. If all of the values of T2 are uniformly smaller than the values of T1, then there is again only one group, the inverted list tables group, and all combinations of rows should be done using that method. However, most often there will be a point in the two tables where the values "cross over," that is, where the decreasing entries in one table fall below the increasing entries in the other. In this case, the two groups are formed by grouping all the rows corresponding to the entries in one table just prior to the point where the lists cross over into the group for the method corresponding to that table, and grouping the remaining rows into the group for the method corresponding to the other table. If exactly the same value appears in both tables at the crossover point between the two tables, that row should be assigned arbitrarily to either one of the two groups.

To decide which form to convert to the other form in order to make the final comparison, consider which is less, C(SC) or C(ILT), in the two cases where each row is first converted into the form of the other. Choose the conversion that results in the smaller of C(SC) and C(ILT).

It is emphasized here that the computation of C(SC) values and C(ILT) values can be made by a combination of the teachings of this current invention together with the ordinary skills of those skilled in the art of computing computational complexities, and that, as is taught in this current invention, these computations can be made, as required by this current invention, without an a priori knowledge of the specific results of the application of either the method of superimposed coding or the method of inverted list tables to specific situations that may arise within the coding table.

Preferred Embodiment

The preferred embodiment is now presented. It is assumed that a suitable feature table of k rows and N Records has been constructed by means outside of the scope of this current invention, and the discussion here will focus on the optimization of the speed of access to that feature table.

FIG. 1 shows coding table 10, which encodes the subject feature table according to the invention. The number of Records, N, in the subject feature table is placed in block 11 for subsequent use. The k rows of the subject feature table are represented by k rows in the coding table, here illustrated by blocks 22, 23, and 24. Block 22 corresponds to the first row of the both the coding table and the subject feature table. Block 23 corresponds to the second row of both tables. Block 24 corresponds to the last row of both tables. The ellipsis 25 represents the rows that are omitted from FIG. 1 for clarity. Blocks 15, 16, and 17 serve the same function for the row of block 23 as blocks 12, 13, and 14, respectively, serve for the row of block 22. Similarly, blocks 18, 19, and 20 serve the same function for the row of block 24 as blocks 12, 13, and 14, respectively, serve for the row of block 22. The blocks represented by the ellipsis 25 each similarly have blocks serving the same function for its respective row as blocks 12, 13, and 14, respectively, server for the row of block 22.

Each row of the coding table 10 of FIG. 1 contains three data elements. Taking coding table 10 row 22 as exemplary of all of the coding table 10 rows, block 13 of coding table row 22 holds the bitmap produced by applying the method of superimposed coding to the corresponding row of the subject feature table. Block 14 of coding table row 22 holds the Record list produced by applying the method of inverted list table coding to the corresponding row of the subject feature table. Block 12 of coding table 10 row 22 contains the number of Records indicated by either the number of "1" bits in the bitmap held in block 13 or the number of Records in the list held in block 14, which is the same number in both cases, or block 14, the list form, may be empty as described below.

Figure 2:
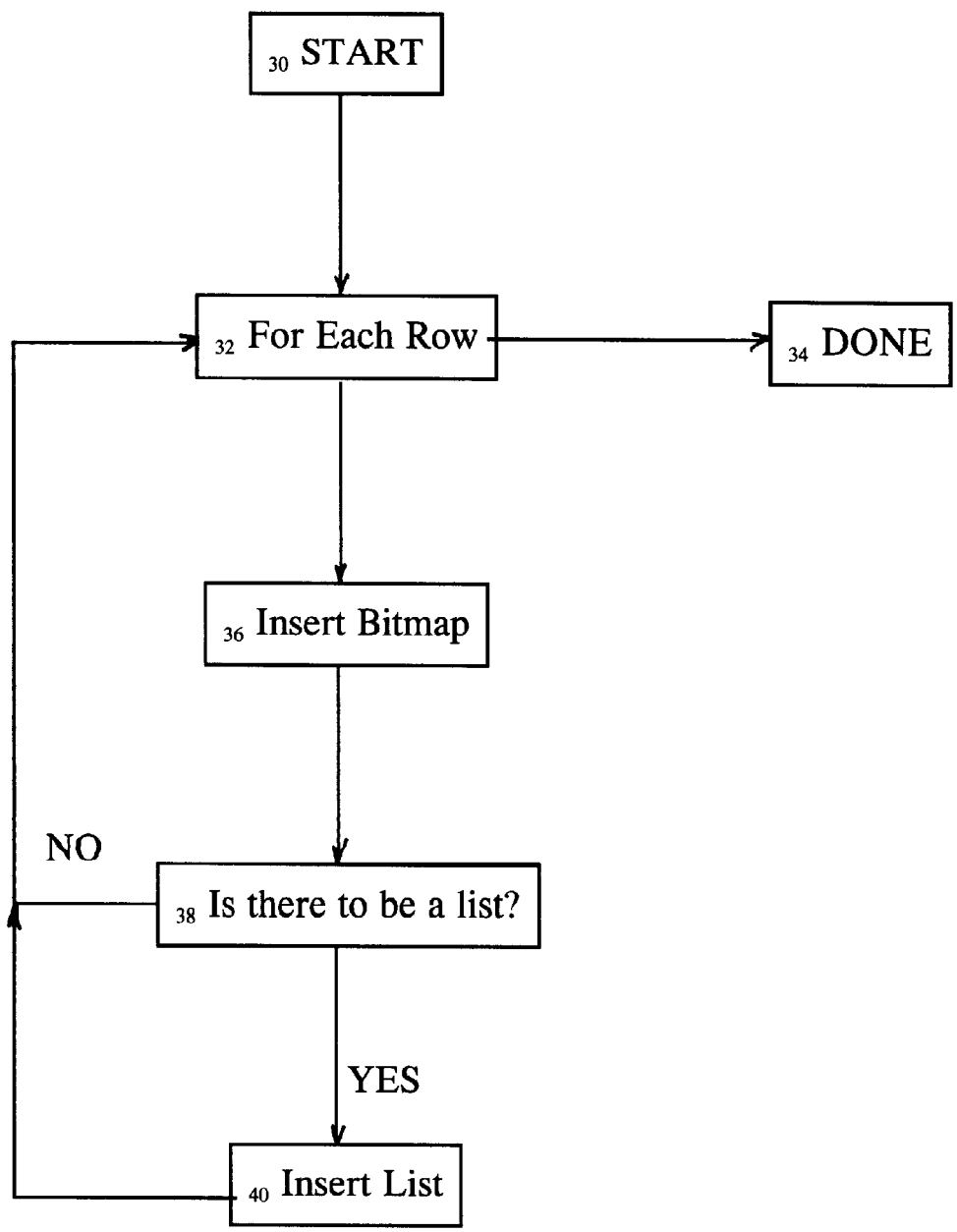
FIG. 2 is a flow chart representing the method of constructing the coding table of the invention.

FIG. 2 is a flow chart representing the method of constructing the coding table 10 of FIG. 1 of the invention. Beginning with Start, block 30, control moves immediately to block 32, which represents a loop control that considers each row of the subject feature table and its corresponding row in the coding table 10, in turn. Block 32 exits through block 34 when there are no more rows to process. For each row, control passes to block 36, where a bitmap representation of the corresponding row of the subject feature table is constructed in the corresponding row of the coding table 10. First, the number of Records, N, in the feature table is stored in block 11. Taking row 22 of coding table 10 of FIG. 1 as exemplary of all of the rows of coding table 10, data is inserted into the blocks of the row as follows. The method of superimposed coding is applied to the corresponding row of the feature table, and the resulting bitmap is stored in the bitmap, block 13. The number of Records of interest in the bitmap, block 13, is stored in block 12. Control passes to block 38 of FIG. 2, where a determination is made whether or not to leave the inverted list, block 14, empty or to fill it.

This determination is made as follows. If the expected computational cost of utilizing the bitmap encoded form, block 13, of the corresponding feature table row, is less than the expected computational cost of utilizing the inverted list encoded form, block 14, of the same feature table row, then the list, block 14, should be left empty. This minimizes storage requirements with no loss of efficiency in the event that the row is in fact "dense," because the bitmap form, block 13, must be present in all cases, while the list form, block 14, is more inefficient as compared to the bitmap form, block 13, if the coding table row 22, or equivalently its corresponding feature table row, is more dense.

In many cases, a simple calculation will often be adequate to make the determination of block 38. If the number of bits involved in representing a given list will be less than the number of bits involved in representing a given bitmap, then the list should be included, that is, the answer to the question of block 38 is "yes"; otherwise, the answer to the question of block 38 is "no". This is a rough approximation to the actual computation of the computational complexities involved, and is quick and easy to apply. If a more reliable measure is desired, more elaborate means of determining computational complexity must be used, in the manner of such things known to those skilled in the art of determining computational complexities.

If it is determined that the list should be left empty, then the "no" exit is taken from block 38 and control passes to block 32. If the determination is to fill the list, block 14, then the "yes" exit is taken from block 38 and control passes to block 40. In block 40, the method of inverted list tables is applied to the corresponding row of the feature table, and the resulting inverted list is stored in the appropriate list for the row, for example block 14. Control then passes to block 32.

Figure 3:
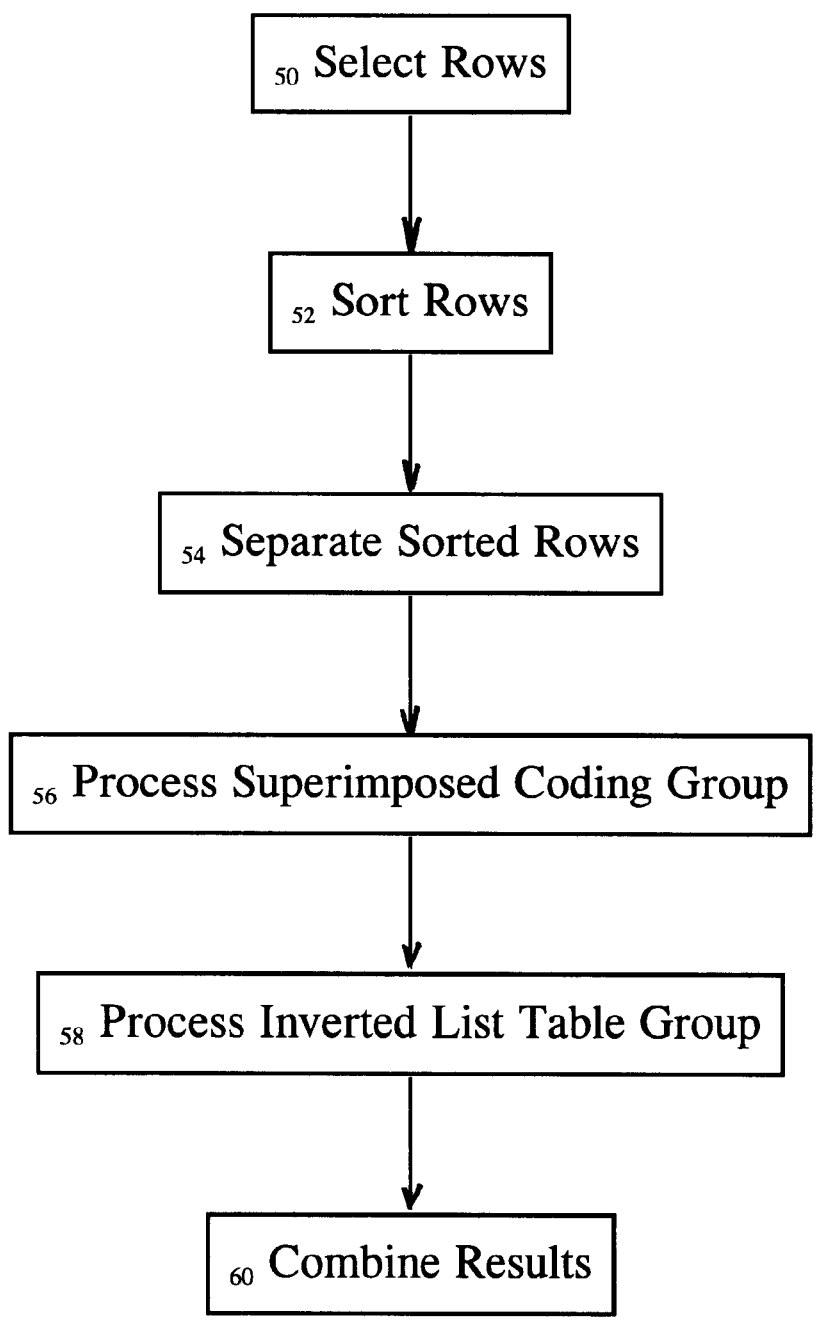
FIG. 3 is a flow chart representing the method of utilizing the coding table of the invention.

FIG. 3 is a flow chart representing the method of utilizing the coding table 10 of the invention. Block 50 represents the process by which some of the rows of the feature table are selected, which is accomplished by means beyond the scope of this current invention. What is important here is that a selection of rows is done in some manner, with that selection then passed to block 52. In block 52, the selected rows are sorted according to the number of Records of interest in each row. For example, in FIG. 1, if the rows of block 22, block 23, and block 24 were selected, then these selected rows would be sorted by utilizing block 12, block 15, and block 18, respectively.

In block 54 of FIG. 3, the sorted rows are separated into two groups as previously described. The group of rows designated for processing by the method of superimposed coding are so processed in block 56 as previously described. The group of rows designated for processing by the method of inverted list tables are so processed in block 58, as previously described. Finally, in block 60, the results produced by block 56 and block 58 are combined to produce the final list of Records of interest for this utilization of the coding table 10, in the manner previously described.

Conclusions, Ramifications, and Scope of Invention

The foregoing disclosure and description of the invention are illustrative and explanatory thereof. It will be understood by those skilled in the art to which this invention pertains that various modifications may be made in the details and arrangements of the processes and of the structures described herein in order to explain the nature of the invention without departing from the principles and/or spirit of the foregoing teachings.

It is to be further understood that the descriptions contained herein are not limited to the specific forms disclosed by way of illustration, but may assume other embodiments limited only by the scope of the appended claims and their legal equivalents.

What is claimed is:

1. A method for manipulating data in a general purpose digital computing system having memory means, central processing means, and a bus network means interconnecting said central processing means and said memory means, for providing means for improving the speed of operation of an implementation of a construct such as a feature table, comprising:

(a) establishing in said memory means a coding table by
(1) installing the bitmap of a superimposed coding of a row of said feature table into said coding table, for all rows of the feature table; and,
(2) installing the list of an inverted list table coding of a row of said feature table into said coding table, only if the expected computational cost of utilizing the list table form for said row is less than the expected computational cost of utilizing the superimposed coding form of said row, considered on a row-by-row basis in the feature table; and, (b) utilizing said coding table to produce a final list of records of interest by
(1) accepting a selection of rows of the coding table;
(2) sorting said selected rows by the number of records of interest in each row;
(3) separating said sorted rows into two groups, a group A for which the computational cost of processing by means of the method of superimposed coding is less, and a group B for which the computational cost of processing by means of the method of inverted list tables is less;
(4) processing said group A according to the method of superimposed coding to produce a result A;
(5) processing said group B according to the method of inverted list tables to produce a result B; and,
(6) combining said result A with said result B to produce said final list of records of interest.

2. Means for improving the speed of operation of an implementation of a construct such as a feature table, comprising:

(a) means for establishing in said memory means a coding table, comprising:
(1) means for installing the bitmap of a superimposed coding of a row of said feature table into said coding table, for all rows of the feature table; and,
(2) means for installing the list of an inverted list table coding of a row of said feature table into said coding table, only if the expected computational cost of utilizing the list table form for said row is less than the expected computational cost of utilizing the superimposed coding form of said row, considered on a row-by-row basis in the feature table; and, (b) means for utilizing said coding table to produce a final list of records of interest, comprising:
(1) means for accepting a selection of rows of the coding table;
(2) means for sorting said selected rows by the number of records of interest in each row;
(3) means for separating said sorted rows into two groups, a group A for which the computational cost of processing by means of the method of superimposed coding is less, and a group B for which the computational cost of processing by means of the method of inverted list tables is less;
(4) means for processing said group A according to the method of superimposed coding to produce a result A;
(5) means for processing said group B according to the method of inverted list tables to produce a result B; and,
(6) means for combining said result A with said result B to produce said final list of records of interest.

* * * * *